United States Patent [19]
Kelly et al.

[11] Patent Number: 5,248,968
[45] Date of Patent: Sep. 28, 1993

[54] TCAS II PITCH GUIDANCE CONTROL LAW AND DISPLAY SYMBOL

[75] Inventors: Brian D. Kelly, Redmond; Paul Stemer, Seattle; John Wiedemann, Bonney Lake; Arthur D. Bernstein, Renton; Robert J. Myers, Everett, all of Wash.

[73] Assignee: The Boeing Company, Seattle, Wash.

[21] Appl. No.: 803,032

[22] Filed: Dec. 6, 1991

[51] Int. Cl.$^5$ ............................................. G08G 5/04
[52] U.S. Cl. ................................... 340/961; 340/973; 340/975; 342/29; 364/461
[58] Field of Search ........................ 340/961, 973, 975; 342/29, 32, 455, 420; 364/461, 457

[56] References Cited

U.S. PATENT DOCUMENTS

| | | | |
|---|---|---|---|
| 3,521,227 | 7/1970 | Congleton et al. | 340/975 |
| 4,060,805 | 11/1977 | McComas | 343/6.5 LC |
| 4,419,079 | 12/1983 | Georges et al. | 340/973 |
| 4,454,496 | 6/1984 | Lowe | 340/973 |
| 4,563,742 | 1/1986 | McElreath | 340/975 |
| 4,710,774 | 12/1987 | Gunny | 342/455 |
| 4,782,450 | 11/1988 | Flax | 364/461 |
| 4,794,354 | 12/1988 | Dinsmore et al. | 333/207 |
| 4,855,748 | 8/1989 | Brandao et al. | 342/455 |
| 4,870,425 | 9/1989 | Gunny | 342/455 |
| 4,899,157 | 2/1990 | Sanford et al. | 342/40 |
| 4,910,513 | 3/1990 | Kelly et al. | 340/975 |
| 4,910,526 | 3/1990 | Donnangelo et al. | 342/455 |
| 4,914,733 | 4/1990 | Gralnick | 340/961 |
| 4,945,550 | 7/1990 | Krause et al. | 375/94 |

OTHER PUBLICATIONS

"Human Factors Play Large Role in Fokker TCAS Cockpit Adaptation", *Aviation Week & Space Technology*, Jun. 17, 1991, pp. 165–166.

*Primary Examiner*—Donnie L. Crosland
*Attorney, Agent, or Firm*—Christensen, O'Connor, Johnson & Kindness

[57] ABSTRACT

An airplane pitch guidance control law and display symbol for a Traffic alert and Collision Avoidance System (TCAS) is disclosed. The control law converts a TCAS computer-generated vertical air speed command into a pitch guidance command. The pitch guidance command controls the location of a symbol (51) on the pitch axis of an electronic attitude display (21) that guides a pilot toward a pitch attitude that will result in a vertical speed that eliminates a collision threat. The preferred symbol is a pitch axis leg (53) and a pair of outwardly diverging legs (55a, 55b). The pitch axis leg (53) defines the minimum climb or descent attitude required to achieve a safe climb or descent angle. The pitch axis leg (53) and the diverging legs (55a, 55b) combine to define a climb or descent attitude range to avoid. The distance between the pitch axis leg 53 and the boresight 39 of the airplane symbol of the display is controlled by a RA$_{CMD}$ signal produced by: subtractively combining the vertical speed command (V$_{STCAS}$) produced by a TCAS II computer and the vertical speed of the airplane (V$_{SIND}$); multiplying the result by a sensitivity factor K whose value is related to the true air speed of the airplane and 57.3 to approximate the arc tangent of the quotient; and subtracting a factor that compensates for the fact that flight path angle changes lag pitch attitude changes.

30 Claims, 7 Drawing Sheets

TCAS II PITCH GUIDANCE CONTROL LAW AND DISPLAY SYMBOL

TECHNICAL AREA

This invention relates to avionics systems and, more particularly, air traffic alert and collision avoidance systems.

BACKGROUND OF THE INVENTION

An air Traffic alert and Collision Avoidance System (TCAS) is an independent airborne system designed to act as a backup to Air Traffic Control (ATC) and the "see and avoid" tactic exercised by the flight crew of an airplane. After two decades of development by the Federal Aviation Administration (FAA) and private contractors, TCAS has matured to a level where United States public law now requires that a TCAS be installed on commercial airplanes with more than thirty seats, starting in December of 1990.

A TCAS-equipped airplane is surrounded by TCAS-protected airspace whose physical dimensions vary as a function of altitude and closure rate, i.e., the rate at which other airplanes are approaching the TCAS-equipped airplane. Being a time-based avionic system, TCAS continuously estimates and updates the flight paths of other airplanes through the interrogation of, and replies from, airborne radar beacon transponders located onboard the other airplanes. An airplane whose estimated flight path is projected to penetrate the TCAS-protected airspace is considered a collison threat (intruder) and annunciated to the flight crew of the TCAS-equipped airplane.

TCAS-protected airspace can be divided into a caution area and a warning area, based on the estimated time to the Closest Point of Approach (CPA). About 40-45 seconds prior to CPA an intruder penetrates the caution area and causes the annunciation of a Traffic Advisory (TA). If the intruder continues to come closer to the TCAS-equipped airplane, at about 20-25 seconds to CPA, the intruder reaches the warning area, resulting in the annunciation of a Resolution Advisory (RA). Both TAs and RAs are constantly updated and, therefore, provide real time position and advisory information.

TAs and RAs are annunciated both visually and aurally. The aural portion consists of voice messages. The visual portion of TA and RA annunciators includes a traffic display in the horizontal plane and, for RA annunciators, a resolution display in the vertical plane.

Depending on the nature of the avionics of a TCAS-equipped airplane, intruder positions are displayed and, when required, maneuver guidance is given—using shape, color and size cues for different levels of alert—on one or more of the following types of instruments: Electronic Horizontal Situation Indicator (EHSI), Electronic Attitude Director Indicator (EADI), Navigation Display (ND), Primary Flight Display (PFD), designated Weather Radar (WXR) or a modified (liquid crystal) Vertical Speed Indicator (VSI). The flight crew uses the displayed information as an aid to visually locating an intruder and, if necessary, taking action to avoid a collision.

In the past, resolution advisories, i.e., RAs, of TCAS II-equipped airplanes (TCAS II is the second generation of TCAS) have been displayed as a lighted red arc (with or without a green segment) on each pilot's modified VSI, now called an RA/VSI instrument. The lighted red arc forms either a corrective advisory, which calls for a change in the vertical speed of the TCAS II-equipped airplane, such that the vertical speed pointer of the VSI moves outside of the red arc, or a preventive advisory, which calls for restricted changes in the vertical speed of the TCAS II-equipped airplane, such that the vertical speed pointer remains outside of the red arc. The flight crew of the TCAS II-equipped airplane adjusts the vertical speed (rate of climb or descent) of the airplane in the manner dictated by the nature of the advisory. The change in vertical speed changes the flight path of the aircraft in a manner designed to gain sufficient separation from the intruder to eliminate the collision threat.

More specifically, existing TCAS II VSI RAs comprise a red arc (also called a red band) on the dial of each pilot's vertical speed indicator (VSI). The red arc indicates the region of vertical speed (climb or descent) to avoid. A green arc (also called a green band) that appears at the end of red arc corrective RAs is used to assist a pilot in determining which direction to maneuver and to suggest a range of vertical speed that is sufficient to avoid the red region without being excessive. RAs comprise either an Up Advisory or a Down Advisory. An Up Advisory is a red arc that emanates from −6,000 feet per minute (FPM) up to the vertical speed above which a collision threat is eliminated. A Down Advisory is a red arc that emanates from +6,000 FPM down to the vertical speed below which a collision threat is eliminated. Up and Down Advisories can occur simultaneously. In this instance two red arcs emanate up from −6,000 FPM and down from +6,000 FPM occur, to leave a region in between that indicates a vertical speed range adequate for traffic separation.

While TCAS II VSI RAs are satisfactory, they have certain disadvantages. They are not integrated into the primary electronic flight instrument systems of airplanes. They display control information on an instrument that is not used by a pilot to extract control information. They require an expensive retrofit for airplanes equipped with conventional VSIs. More importantly, they are not intuitive. More specifically, changing the climb or descent flight path of an airplane involves changing the pitch attitude of the airplane. Because pilots control pitch with reference to the attitude indicator of an airplane rather than the vertical speed indicator, a TCAS RA in the form of a pitch attitude advisory is more useful than is a VSI advisory.

The present invention is directed to providing a Resolution Advisory (RA) in the form of a pitch guidance symbol on the electronic attitude or primary flight display of an airplane instead of, or in addition to, a conventional TCAS II VSI RA.

SUMMARY OF THE INVENTION

In accordance with this invention, an airplane pitch guidance control law and display symbol for a traffic alert and collision avoidance system (TCAS) is provided. The control law converts a TCAS II computer-generated collision avoidance vertical air speed command into a pitch guidance command. The pitch guidance command controls the position of a symbol on the pitch axis of an electronic attitude display that identifies the climb or descent pitch attitudes available to achieve a climb or descent flight path angle that eliminates a collision threat.

In accordance with further aspects of this invention, the preferred symbol includes a horizontal leg and a pair of outwardly extending legs. The horizontal or pitch axis leg defines the minimum climb or descent attitude required to achieve a safe climb or descent angle.

In accordance with other aspects of this invention, the pitch axis leg and the outwardly extending legs combine to define a climb or descent pitch angle range to avoid.

In accordance with alternative aspects of the invention, the pitch axis leg and the outwardly extending legs combine to define a safe climb or descent pitch angle range.

In accordance with yet other aspects of this invention, the outwardly extending legs converge in a direction that augments the pitch up (or pitch down) information provided by the horizontal (pitch axis) leg.

In accordance with yet further aspects of this invention, the TCAS II computer-generated collision avoidance vertical speed command ($V_{STCAS}$) is subtractively summed with the vertical speed of the TCAS-equipped airplane. The result of the subtraction is multiplied by a sensitivity factor whose value is dependent upon the true air speed of the aircraft and a value (57.3) that approximates the arc tangent of the quotient. The result of the multiplication is combined with the pitch attitude of the aircraft.

In accordance with further aspects of this invention, the pitch attitude of the aircraft is filtered by a second order filter prior to being summed with the sensitivity compensated difference between the TCAS commanded vertical air speed and the actual vertical air speed of the TCAS-equipped airplane. The time constant of the filter is chosen such that the filter compensates for the fact that a change in flight path angle lags a change in pitch attitude.

As will be readily appreciated from the foregoing description, the invention provides a way of equipping an airplane with complete TCAS display capability within the Electronic Flight Instrument Display (EFIS) or the Integrated Display System (IDS) of an airplane by controlling the position of an additional display symbol. This eliminates or reduces the need to retrofit airplanes with conventional TCAS II VSI RAs. Based on the position of the symbol formed in accordance with the invention, all a pilot needs to do to avoid a possible collision is to change the pitch attitude of the airplane and, thereby, initiate a change in flight path. Use of a pitch attitude command for TCAS RAs is more intuitive than the lighted arc of conventional TCAS II VSI RA displays and results in a smoother and more precise response to a TCAS RA command.

BRIEF DESCRIPTION OF THE DRAWINGS

The foregoing and other advantages of this invention will become more readily appreciated as the same becomes better understood by reference to the following detailed description when taken in conjunction with the accompanying drawings wherein.

DESCRIPTION OF THE PREFERRED EMBODIMENTS

In recent years, electronic displays have become widely used onboard airplanes. Electronic displays include a graphic display device, such as a cathode ray tube (CRT), and supporting electronics. The supporting electronics include a symbol generator and other electronic subsystems that coact to create symbols that interact to create displays designed to provide a variety of information to the pilot and/or copilot of an airplane. The displayed information may relate to: the attitude of the airplane; the navigation of the airplane; communication with ground or air traffic control; distance to a landing airport; a nearby airplane; etc.

Figure 1:
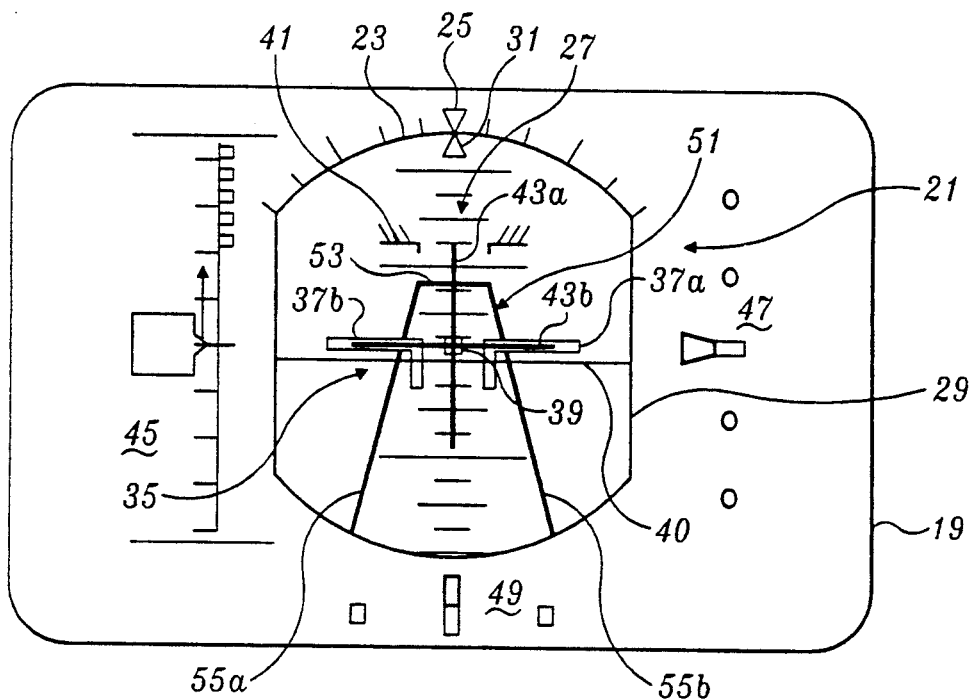
FIG. 1 is a pictorial diagram of the presently preferred form of an electronic attitude display modified in accordance with the invention to provide a corrective resolution advisory.
Figure 2:
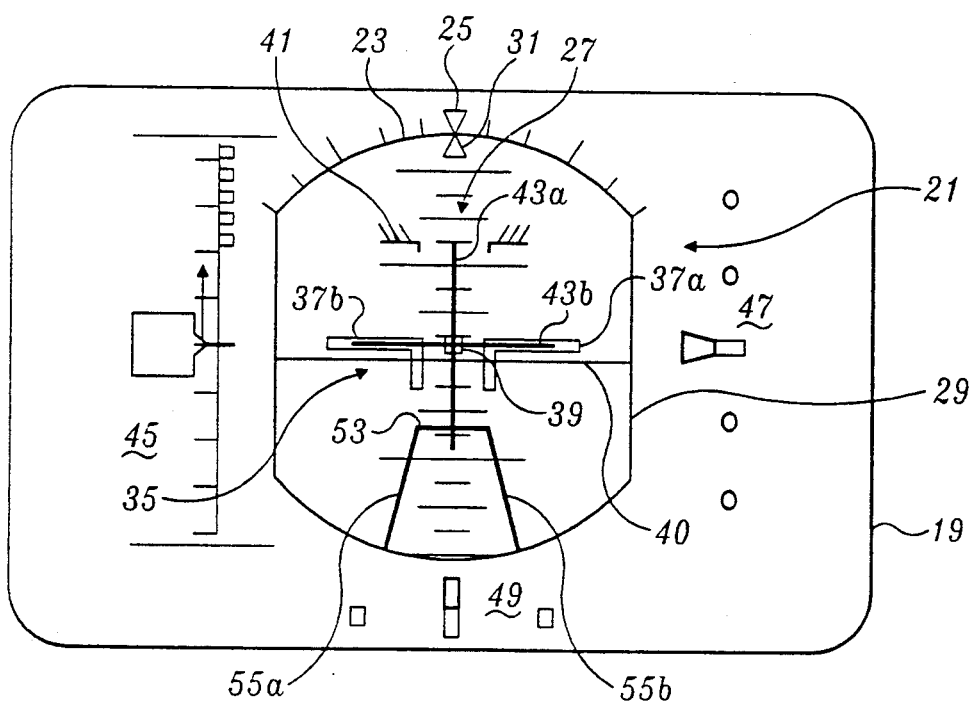
FIG. 2 is a pictorial diagram of the same electronic attitude display shown in FIG. 1 depicting a preventive resolution advisory.

The present invention relates to electronic attitude displays, i.e., electronic displays that display the pitch and roll attitude of the airplane that includes the display. Prior to the creation of electronic displays, airplane attitude (pitch and roll) was displayed on an attitude (or artificial horizon) indicator formed by a gyroscopically controlled ball mounted in a housing. Electronic attitude displays create symbols that replicate these indicators. FIGS. 1 and 2 depict such a display. FIGS. 1 and 2 and the other display figures included in this application have been simplified in that some extraneous, normally generated information has been deleted in order to make it easier to understand the present invention.

The electronic attitude display 21 shown in FIGS. 1 and 2 as part of an electronic flight instrument 19 that includes other displays is intended to look like the gyroscopic artificial horizon indicators used for many years prior to the development of electronic attitude displays. In this regard, the symbols of the electronic attitude display 21 illustrated in FIGS. 1 and 2 include an arcuate roll scale 23 having a center indicator 25. Since the roll scale is not particularly pertinent to the present invention, it will not be further discussed except to note that the roll scale coacts with a roll attitude indicator 31 that is controlled so as to move along the curved roll scale in accordance with the movement of an airplane along the airplane's roll axis.

The electronic attitude display symbols also include a pitch scale 27 and a horizon reference line 40 positioned inside of an outline 29. The outline 29 creates the appearance of the "ball" of a gyroscopically controlled artificial horizon indicator. While not shown in the drawings, in a conventional manner, the pitch scale 27 and the roll attitude indicator 31, which is located directly above the pitch scale 27, are electronically "rotated" as the related airplane moves along its roll axis. Further, the pitch axis scale 27 and the horizon reference line 40 are translated as the pitch attitude of the airplane changes. These actions simulate the movement of a gyroscopically controlled artificial horizon indicator.

In addition to the pitch scale 27, the symbols of the electronic attitude display 21 located within the outline 29 include a three-part airplane symbol 35. The three-part airplane symbol includes right and left wings 37a and 37b and a boresight 39. Also positioned within the outline 29 is a Pitch Limit Indicator (PLI) symbol 41 whose position relative to the wings depicts pitch margin to stall warning. A flight director symbol in the form of vertical and horizontal cross hairs 43a and 43b is also located inside of the outline 29.

Located to the left of the electronic attitude display 21 is an indicated air speed display 45. Located to the right of the electronic attitude display 21 is a glideslope deviation display 47 and located beneath the electronic attitude display 21 is a localizer deviation display 49. Since these displays do not form part of this invention, they are shown in a simplified form and not discussed further.

As will be readily appreciated by those skilled in electronic airplane displays from the foregoing description and viewing FIGS. 1 and 2, FIGS. 1 and 2 illustrate a conventional electronic flight instrument. The present invention is directed to modifying the electronic attitude display part of such instruments in a manner that advises the pilot of an airplane how to adjust the pitch of the airplane in order to avoid a potential collision when an airplane enters the TCAS-protected airspace surrounding the airplane, i.e., when an intruder is present.

As will be better understood from the following description, the invention uses the TCAS commanded vertical speed data ($V_{STCAS}$) produced by a TCAS II computer to create a TCAS RA (resolution advisory) pitch guidance symbol on an electronic attitude display such as the electronic attitude display 21 of the electronic flight instrument 19 illustrated in FIGS. 1 and 2. While various types of pitch guidance symbols can be utilized, the presently preferred form is illustrated in FIGS. 1 and 2.

The pitch guidance symbol 51 illustrated in FIGS. 1 and 2 comprises a horizontal or pitch axis leg 53 and a pair of diverging legs 55a and 55b. The pitch angles outlined by the pitch axis leg 53 and the diverging legs 55a and 55b denote the pitch attitudes to be avoided.

FIG. 1 illustrates a situation where the pitch attitude of the airplane should be changed to avoid a potential collision with an intruder because the three-part airplane symbol 35 lies within the area enclosed by the pitch axis leg 53 and the diverging legs 55a and 55b of the pitch guidance symbol 51. FIG. 2 illustrates the situation where the present pitch attitude of the airplane will provide sufficient separation from the intruder because the three-part airplane symbol 35 lies outside of the area enclosed by the pitch axis leg 53 and the diverging legs 55a and 55b.

Thus, FIG. 1 is a corrective resolution advisory that tells the pilot of the airplane that the collision threat can be eliminated by increasing the pitch angle of the aircraft by an amount adequate to move the three-part airplane symbol 35 above the pitch axis leg 53 of the TCAS RA pitch guidance symbol 51. FIG. 2 is a preventive resolution advisory that tells the pilot that a collision threat will be avoided if the present pitch attitude of the airplane remains unchanged, or is controlled such that a lowering of the nose does not result in the three-part airplane symbol 35 moving into the area covered by the TCAS RA pitch guidance symbol 51.

In summary, as will be better understood from the following description, the invention causes the generation of a TCAS RA pitch guidance symbol on the electronic attitude display of an aircraft that tells a pilot how to control the pitch attitude of the aircraft to avoid a collision threat.

Figure 3:
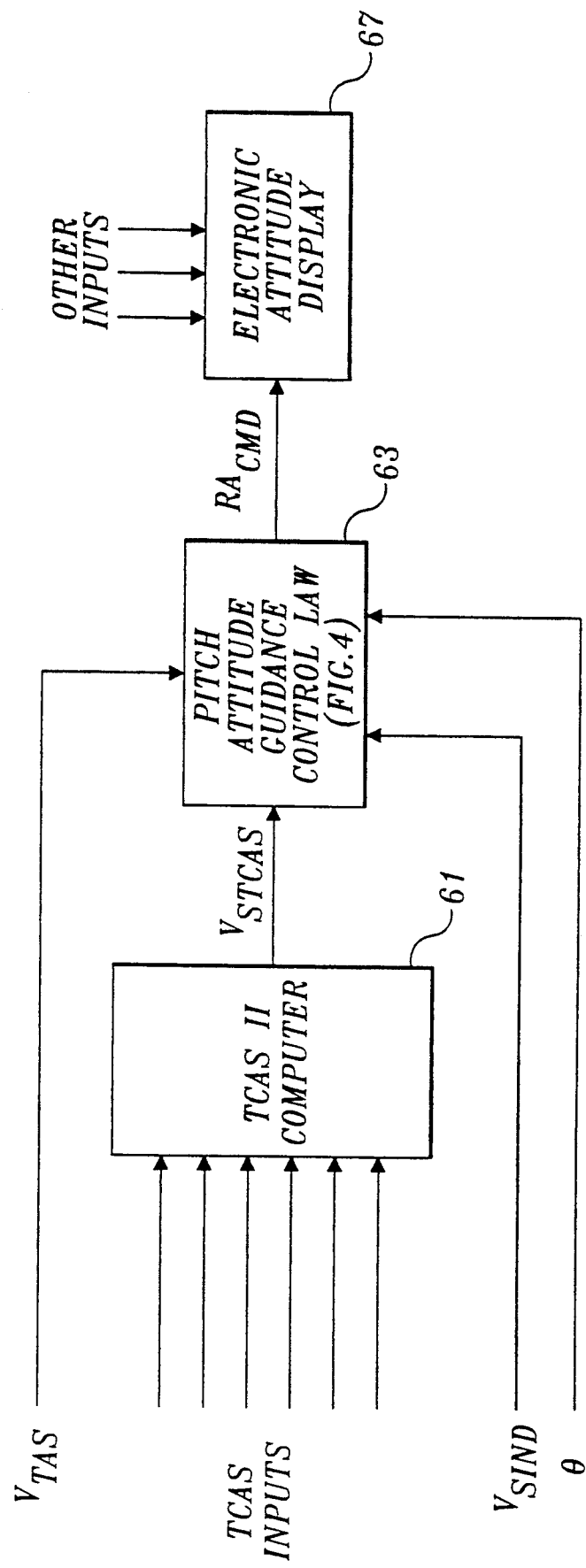
FIG. 3 is a block diagram that functionally depicts a modified display system fed by a TCAS II computer designed to create an electronic attitude display of the type shown in FIGS. 1 and 2.

FIG. 3 is a block diagram of a system formed in accordance with the invention for creating a TCAS RA pitch guidance symbol of the type illustrated in FIGS. 1 and 2. The system illustrated in FIG. 3 includes: A TCAS II computer 61; a pitch attitude guidance control law 63; and an electronic attitude display 67. The TCAS II computer 61 produces, in a conventional manner, TCAS commanded vertical speed data ($V_{STCAS}$) in suitable units (feet/minute). Since the TCAS II computer does not form a part of the present invention, it is not described here. The pitch attitude guidance control law, which is described below and can be implemented in hardware or software form, receives the $V_{STCAS}$ data produced by the TCAS II computer 61.

Data representing the vertical speed of the airplane in which the invention is mounted (i.e., the ownship), denoted $V_{SIND}$, is also supplied to the pitch attitude guidance control law 63, as is a data representing the pitch attitude, $\theta$, and the true air speed ($V_{TAS}$) of the aircraft. As more fully described below, the pitch attitude guidance control law generates a sensitivity value, denoted K, that is a function of $V_{TAS}$.

The pitch attitude guidance control law 63 combines the values of K, $V_{STCAS}$, $V_{SIND}$, and $\theta$, in the manner illustrated in FIG. 4 and described below, and produces a resolution advisory command ($RA_{CMD}$). $RA_{CMD}$ defines the distance between the reference point of the airplane symbol, i.e., the location of the center of the boresight 39, and the pitch axis leg 53 of the RA pitch guidance symbol 51. More specifically, the electronic attitude display 67 receives the $RA_{CMD}$ value and uses this value to define the location of the pitch axis leg 53 of the RA pitch guidance symbol with respect to the center of the boresight 39 of the three-part airplane symbol. A symbol generator that forms part of the electronic attitude display 67 controls the length of the pitch axis leg and the length and position of the diverging legs 55a and 55b, which, as illustrated in FIG. 1 and described above, extend from the ends of the horizontal leg 53 to the lower curved portion of the display outline 29. Other, unrelated, inputs cause the electronic attitude display to generate and control the position of the other symbols illustrated in FIGS. 1 and 2 and described above.

As will be better understood from the following description, in essence, the distance in pitch scale degrees between the center of the boresight 39 of the three-part airplane symbol 35 and the pitch axis leg 53 of the TCAS RA pitch guidance symbol 51 is determined by the difference between the TCAS commanded vertical speed ($V_{STCAS}$) and the ownship vertical speed ($V_{SIND}$). This difference is multiplied by a sensitivity value that, as described below, is usually equivalent to $1/V_{TAS}$ multiplied by 57.3 to approximate the arc tangent of the quotient. The resulting value is representative of the change in flight path angle necessary to achieve the commanded $V_{STCAS}$ vertical speed. The value is further modified by subtracting a term that takes into account the fact that flight path angle changes lag pitch attitude changes. As a result, the pitch axis leg 53 of the TCAS RA pitch guidance symbol 51 moves dynamically, in a manner similar to the movement of the horizon reference line 40 of the electronic attitude display, as moderate pitch maneuvers are made. The calculation is made independently for up and down advisories.

The form of the equation for carrying out the pitch attitude guidance control law is:

$$RA_{CMD} = K(V_{STCAS} - V_{SIND}) - \theta \left(\frac{ts}{ts+1}\right) \quad (1)$$

where:

$RA_{CMD}$ is the distance between the reference point of the airplane symbol, i.e., the center of the boresight 39, and the pitch axis leg 53, in units of pitch scale degrees.

K is a sensitivity value that is more fully described below.

$V_{STCAS}$ is the vertical speed in feet per minute commanded by the TCAS II computer 61.

$V_{SIND}$ is the ownship indicated vertical speed in feet per minute.

$\theta$ is the pitch attitude of the ownship in degrees.

t is the time constant for the LaPlace transform washout function. A representative value is one (1) second.

s is the standard LaPlace transform operator.

Figure 4:
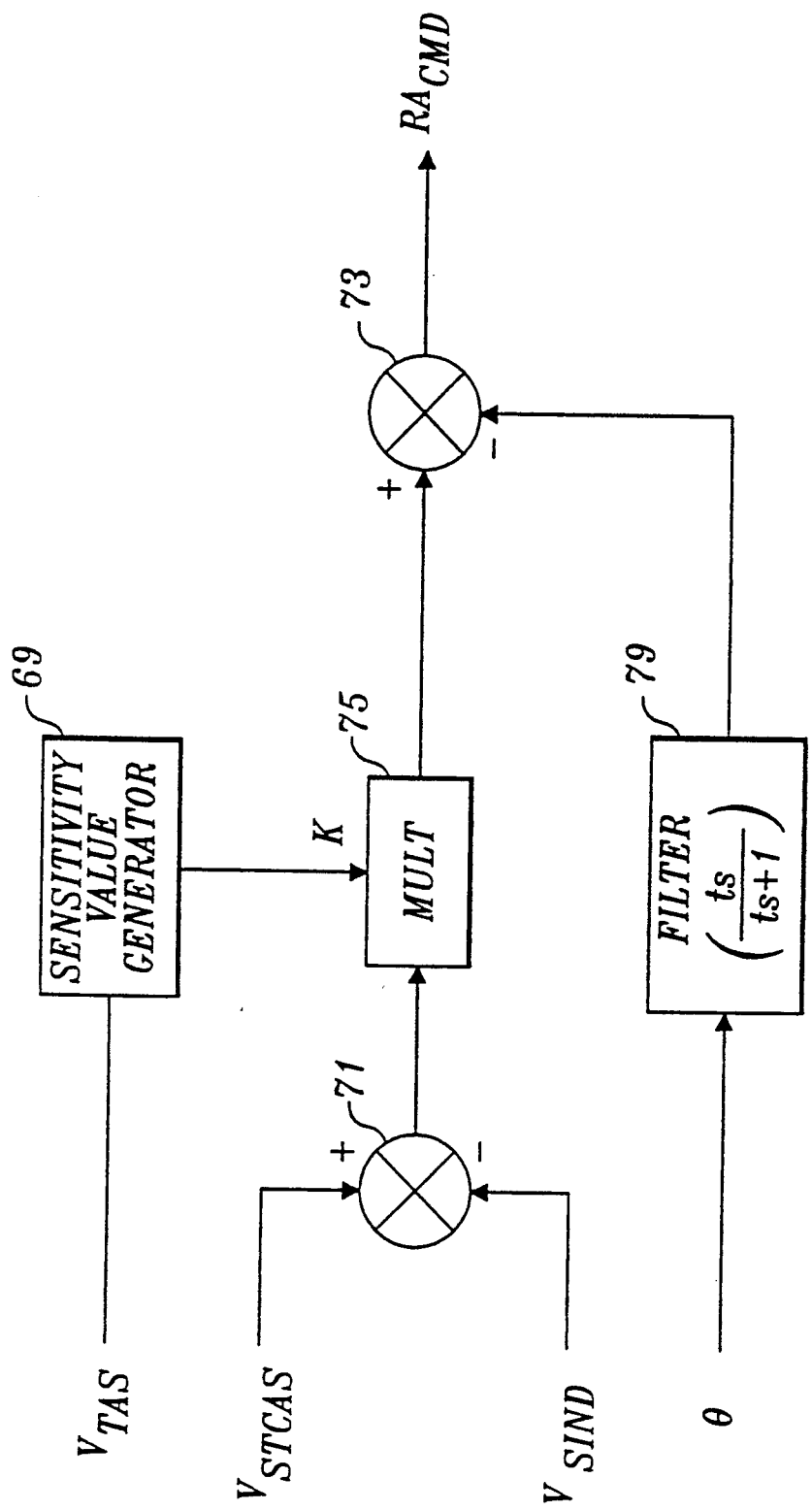
FIG. 4 is a diagram illustrating the pitch attitude guidance control law portion of FIG. 3.

FIG. 4 is a block diagram illustrating one way of carrying out the control law set forth in Equation (1). FIG. 4 includes: a sensitivity value generator 69; two subtractive summers 71 and 73; a multiplier 75; and a first order filter 79. The first order filter carries out the LaPlace transform function of the foregoing equation and, thus, can be represented by the equation:

$$\left(\frac{ts}{ts+1}\right) \quad (2)$$

The $V_{STCAS}$ data produced by the TCAS II computer is applied to one input of the first subtractive summer 71 and $V_{SIND}$ is applied to the second input of the first subtractive summer 71. The output of the first subtractive summer, which is the difference between $V_{STCAS}$ and $V_{SIND}$, is applied to one input of the multiplier 75. The sensitivity value data, K, produced by the sensitivity value generator 69 in the manner hereinafter described is applied to the second input of the multiplier 75. Thus, the output of the first multiplier is K ($V_{STCAS}-V_{SIND}$). This output is applied to one input of the second subtractive summer 73. The $\theta$ data is filtered by the first order filter 79 and the result applied to the second input of the second subtractive summer 73. As a result, the output of the second subtractive summer is $RA_{CMD}$ data.

Figure 5:
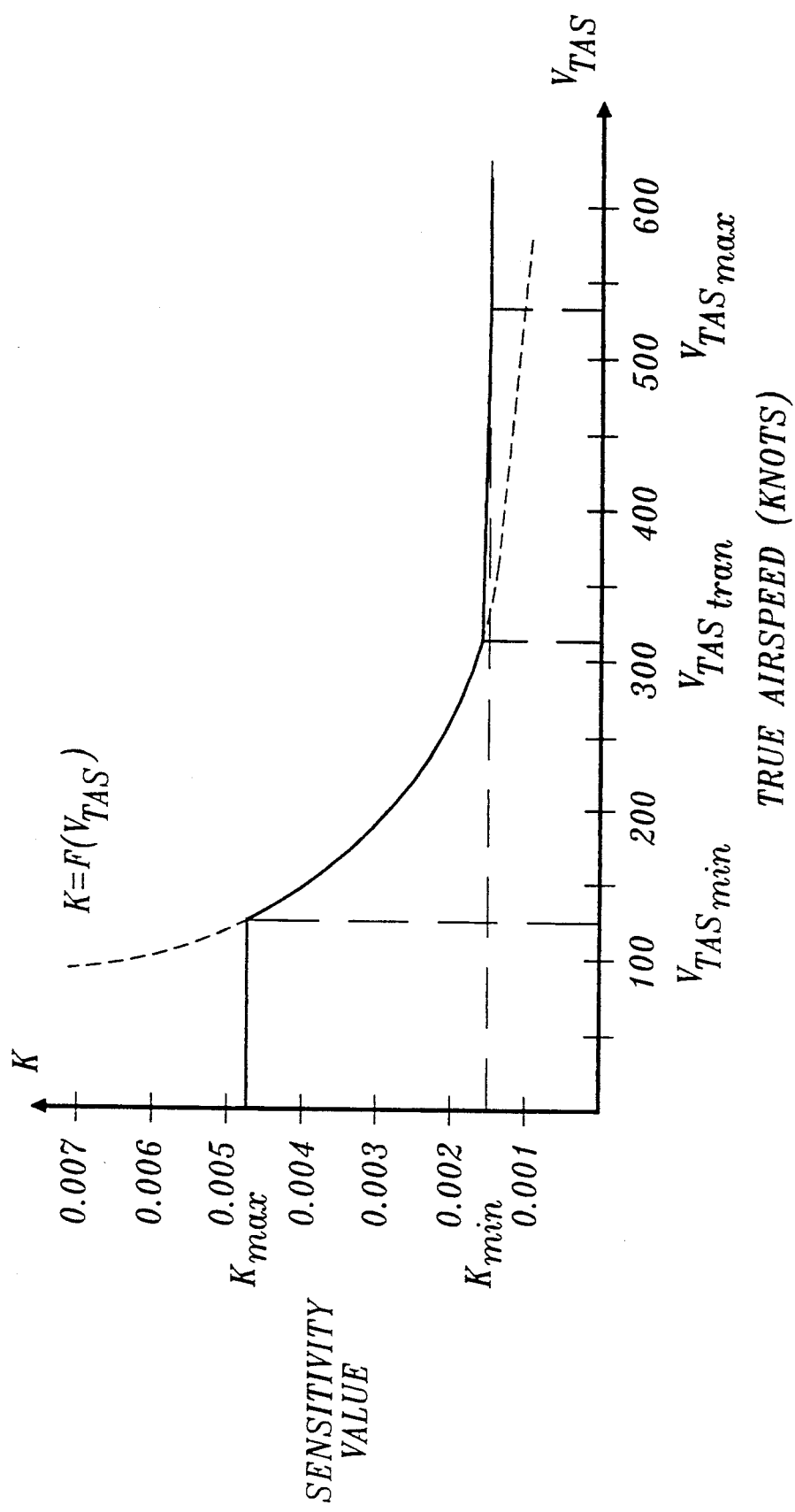
FIG. 5 is a graph illustrating the relationship of the sensitivity value (K) output to the true air speed ($V_{TAS}$) input of the sensitivity value generator included in FIG. 3.

As illustrated in FIG. 5, between maximum ($K_{max}$) and minimum ($K_{min}$) values, the sensitivity value, K, is a function of true air speed. Between a given lower limit ($V_{TASmin}$) and an average true air speed value ($V_{TAStran}$), K is equal to:

$$K = \frac{57.3}{101.27 V_{TAS}} \quad (3)$$

where:

$V_{TAS}$ is in knots.

57.3 approximates the arc tangent of the quotient.

101.27 converts $V_{TAS}$ from knots to feet per minute.

Equation (3) produces a command that is equivalent in magnitude to the change in flight path angle necessary to achieve a target vertical air speed. The upper boundary of K (i.e., $K_{max}$), which occurs at very low air speeds, prevents the displaying of excessively large TCAS RA pitch guidance symbols. Above $V_{TAStran}$ K decreases linearly, until a given upper limit true air speed value ($V_{TASmax}$) is reached, above which a constant lower boundary of K ($K_{min}$) is maintained. This ensures that adequate displacement of the pitch axis leg 53 will occur even when true air speed is high. If this is not done at high true air speed, the sensitivity of the display may not be adequate in getting a pilot's attention to precisely fly in the commanded manner.

As noted above, the term $\theta$ (ts/ts+1) is subtracted from the first part of the equation to account for the fact that changes in flight path angle lag changes in pitch attitude. As will be appreciated by those skilled in the aircraft display control art, the same term is used to "quicken" the inertial flight path angle included on some attitude displays. In this case, the term is subtracted so that the command appears to be fixed with respect to the horizon reference line 40 for as long as the pitch of the airplane is changed at a normal to moderate rate.

While not shown in FIGS. 3 or 4, preferably, the position of the pitch axis leg 53 is limited by the position of the Pitch Limit Indicator (PLI) symbol 41. In this way, a pilot can always respond to the TCAS RA pitch guidance display without the display implying that the pilot is being instructed to fly the airplane into "stick shaker." Also not illustrated in FIGS. 3 and 4, preferably, the maximum TCAS RA pitch indication for both up and down advisories is limited to a fixed value of pitch scale degrees. This is done to prevent very large commands from causing the pitch axis leg to disappear off the edge of the electronic attitude display 21.

Figure 6:
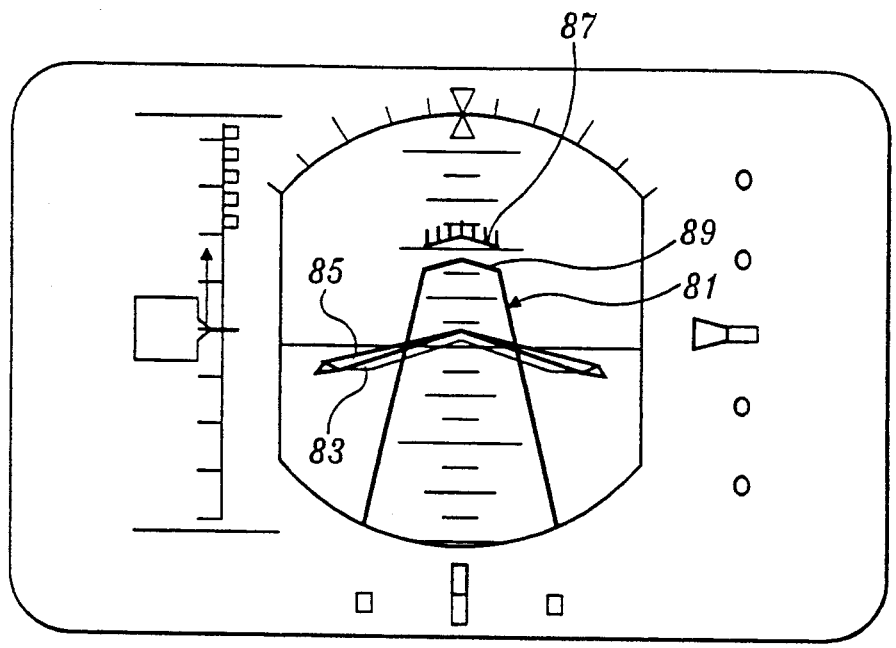
FIGS. 6–11 illustrate alternative electronic attitude displays modified in accordance with the present invention.

While the TCAS RA pitch guidance symbol 51 illustrated in FIGS. 1 and 2 is presently the most preferred, other symbols can be used, if desired. FIGS. 6-11 illustrate other types of symbols. FIG. 6 illustrates a TCAS RA pitch guidance symbol 81 usable in connection with electronic attitude displays wherein the airplane symbol 83, the flight director symbol 85 and the Pitch Limit Indicator (PLI) symbol 87 are all in the form of inverted Vs (integrated cue format). In this case, the pitch axis leg 89 of the TCAS RA pitch guidance symbol 81 is also in the form of an inverted V.

Figure 7:
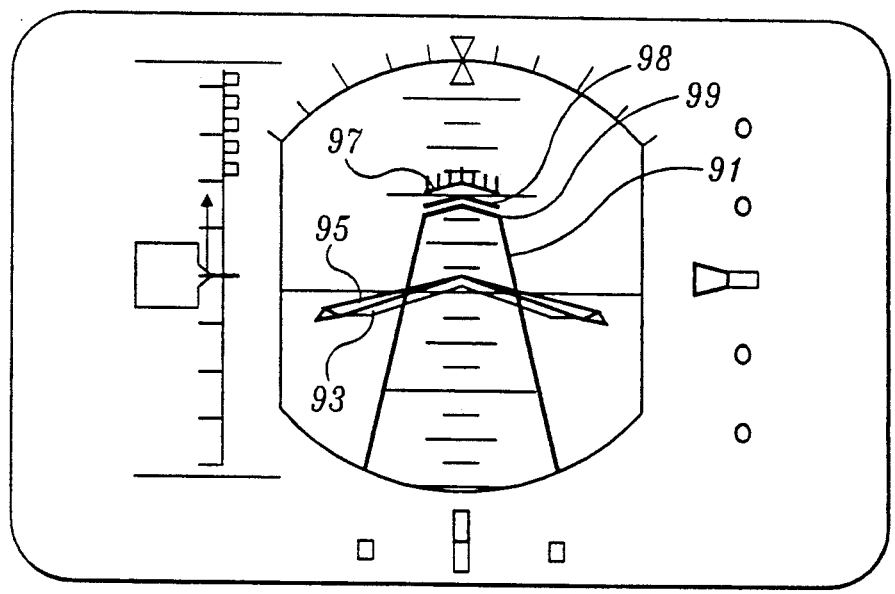

FIG. 7 illustrates an electronic attitude display having a TCAS RA pitch guidance symbol 91 similar to the TCAS RA pitch guidance symbol 81 illustrated in FIG. 6. Also like FIG. 6, the airplane symbol 93, the flight director symbol 95 and the Pitch Limit Indicator (PLI) symbol 97 are in the form of inverted Vs. The primary difference between FIG. 6 and FIG. 7 is the addition of an inverted V 98 located at the end of the TCAS RA pitch guidance symbol 91 for corrective RAs only. Preferably, the additional inverted V 98 is in a color (e.g., magenta or green) that is different from either the TCAS RA pitch guidance symbol 91 (e.g., red) and the Pitch Limit Indicator (PLI) symbol (e.g., yellow). The use of the additional inverted V directs a pilot's attention to a pitch angle that will eliminate a collision threat without using excessive pitch. Preferably, the additional inverted V is only generated when a corrective resolution advisory, as opposed to a preventive resolution advisory, is being generated.

Figure 8:
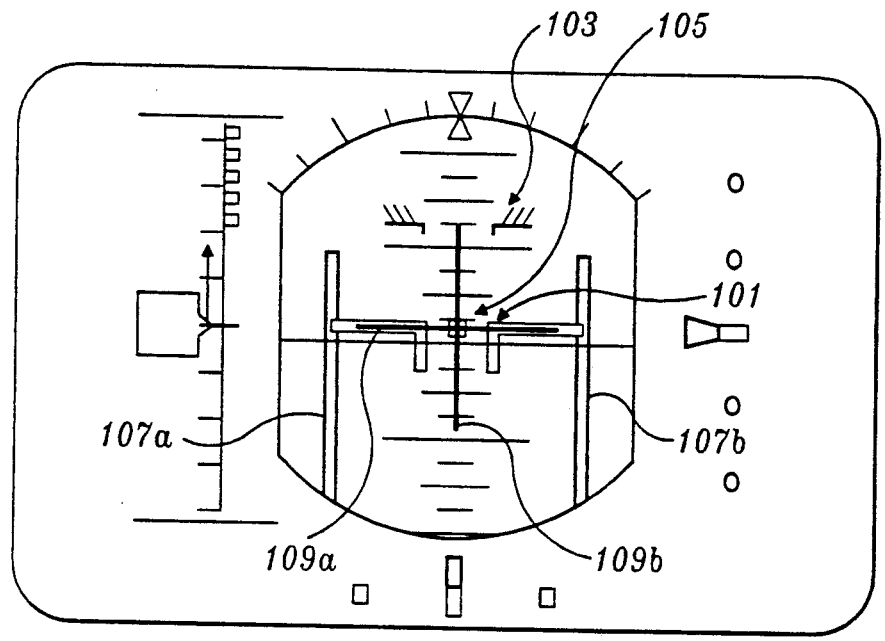

FIG. 8 illustrates a display wherein the airplane symbol 101, the Pitch Limit Indicator (PLI) symbol 103 and the flight director symbol 105 are the same as shown in FIGS. 1 and 2. However, rather than a TCAS RA pitch guidance symbol for corrective RAs is formed by a pitch axis leg and a pair of diverging legs, the TCAS RA pitch axis guidance symbol illustrated in FIG. 8 is formed by a pair of wide vertically oriented bars 107a and 107b. The vertically oriented bars 107a and 107b lie at the outer ends of the right and left wings 109a and 109b of the airplane symbol 101. The height of the bars is, of course, controlled by the magnitude of the $RA_{CMD}$ data signal.

Figure 9:
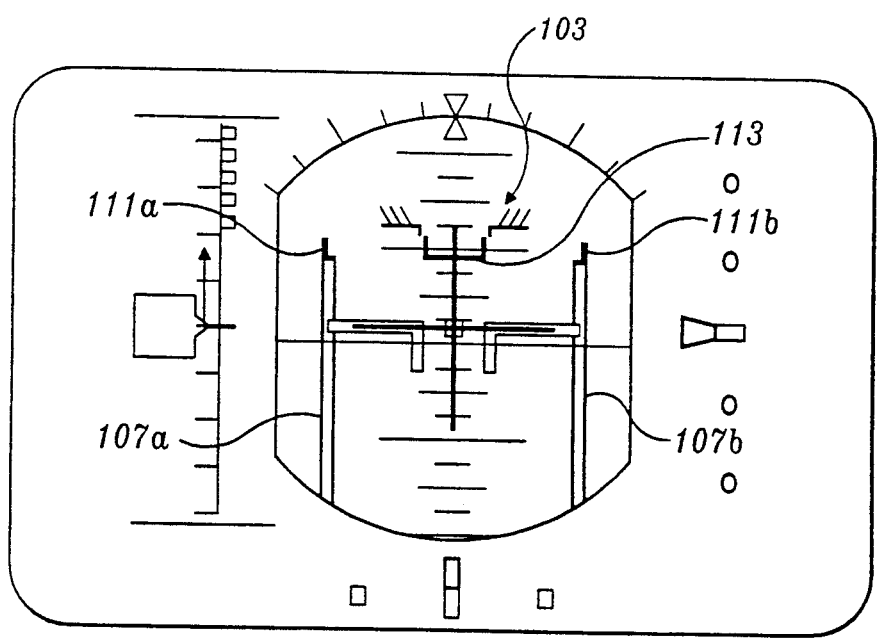

For corrective RAs, FIG. 9 illustrates a display identical to that shown in FIG. 8 with the addition of narrow, short vertical legs 111a and 111b located atop the wider vertical legs 107a and 107b. Also, centrally located between the short vertical legs 111a and 111b, along the pitch axis scale, is a U-shaped symbol 113. The horizontal leg of the U-shaped symbol 113 is in line with the tops of legs 107a and 107b and the tops of the vertical legs of the U-shaped symbol 113 are in line with the tops of the narrow, short legs 111a and 111b. The narrow, short legs 111a and 111b and the U-shaped symbol 113 are, like the extra inverted V 98 in the display illustrated in FIG. 7, designed to direct a pilot's attention to the pitch angles needed to avoid a collision threat. In this regard, preferably, the color (e.g., green) of the narrow, short vertical legs 111a and 111b and the U-shaped symbol 113 is different from the color (e.g., red) of legs 107a and 107b (e.g., red) and the color (e.g., yellow) of the Pitch Limit Indicator (PLI) symbol 103. While the short narrow legs can exist whenever a resolution advisory symbol is present, preferably they only exist when the resolution advisory is corrective.

Figure 10:
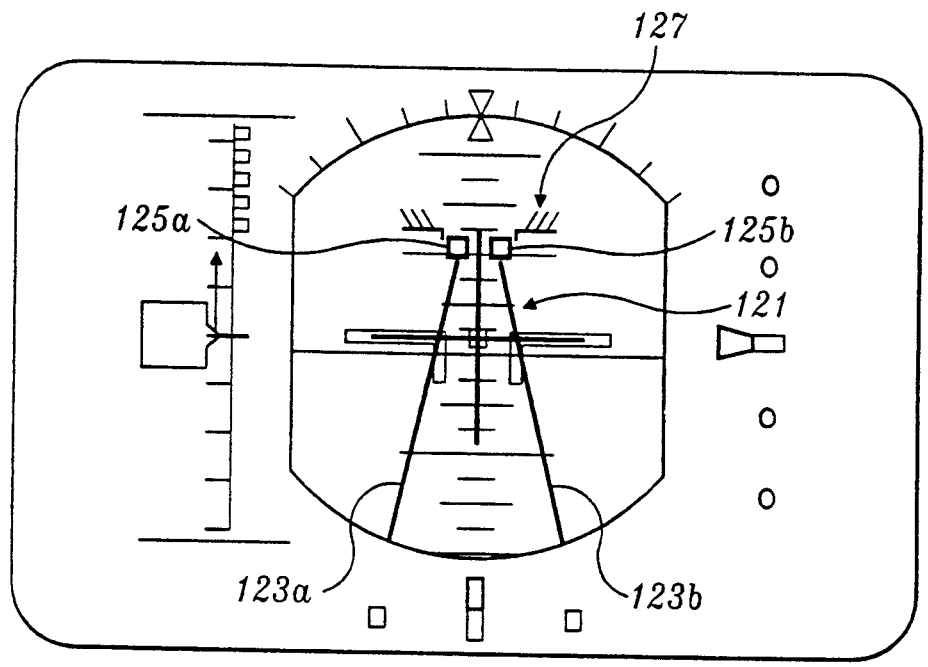

FIG. 10 illustrates a display generally similar to the display illustrated in FIGS. 1 and 2 except that the TCAS RA pitch guidance symbol 121 (for corrective RAs) does not include a pitch axis leg. Rather, located atop each of the inclined legs 123a and 123b of the TCAS RA pitch guidance symbol 121 is a block-like symbol 125a and 125b. Preferably, the color (e.g., green) of the block-like symbols is different from the color (e.g., red) of the inclined legs 123a and 123b and the color (e.g., yellow) of the Pitch Limit Indicator (PLI) symbol 127. The difference in shape and color directs a pilot's eyes toward the pitch angle required to avoid a collision threat. While the block-like symbols 125a and 125b can exist whenever a resolution advisory is present, preferably they are not present when the resolution advisory is preventive.

Figure 11:
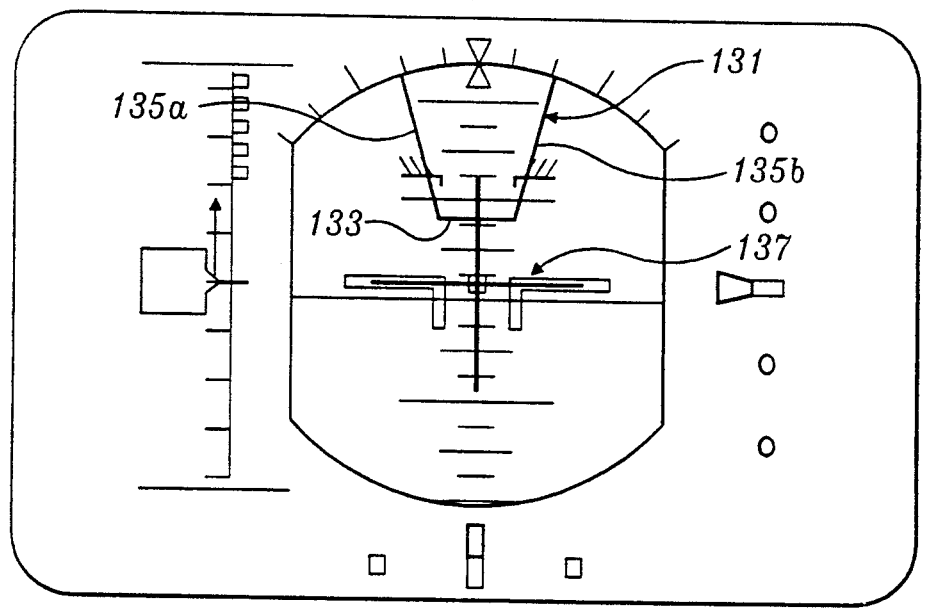

FIGS. 1, 2 and 6–10 have all illustrated up Resolution Advisory situations, i.e., situations where the pilot is advised to climb (corrective advisory) or where the pilot is advised that a threat will be avoided if the airplane does not descend (preventive advisory). FIG. 11 illustrates the opposite, i.e., a down Resolution Advisory. That is, FIG. 11 illustrates a display that shows the converse of the display illustrated in FIGS. 1 and 2. More specifically, as described above, the TCAS RA pitch guidance symbol 51 illustrated in FIGS. 1 and 2 outlines an area that is to be avoided, i.e., the symbol tells the pilot to pitch the airplane up such that the airplane symbol stays outside of the area enclosed by the TCAS RA pitch guidance symbol 51. FIG. 11 also illustrates a TCAS RA pitch guidance symbol 131 formed by a pitch axis leg 133 and a pair of diverging legs 135a and 135b. As before, the portion of the pitch axis lying outside of the outlined area is safe, i.e., it is a region wherein the threat of a collision is avoided. However, in this case the outlined area lies above, rather than below, the airplane symbol 137. Thus, the pilot is advised that a threat will be avoided if the airplane does not climb. The pilot is also advised that the airplane can descend.

While the most preferred and other preferred displays have been illustrated in the drawings described above, it is to be understood that other displays can be used to provide a workable embodiment of the invention, if desired.

In summary, the invention provides an airplane pitch guidance control law and display symbol for a Traffic alert and Collision Avoidance System (TCAS). A TCAS II computer evaluates a traffic threat and determines a vertical speed command for an up or down advisory. In accordance with this invention the TCAS II vertical speed command is modified by a pitch attitude guidance control law to create a signal suitable for controlling the distance between the reference point of an airplane symbol and a limit, which may be in the form of a horizontal bar or other horizontal symbol. The pitch attitude guidance control law determines the difference between the vertical air speed of the aircraft and the TCAS commanded vertical air speed and multiplies this difference by a sensitivity value and a value that approximates the arc tangent of the quotient. From the resultant value is subtracted a factor that accounts for the fact that changes in flight path angle lag changes in pitch attitude.

While preferred embodiments of the invention have been illustrated and described, it will be appreciated that various changes can be made therein without departing from the spirit and scope of the invention as defined by appended claims.

The embodiments of the invention in which an exclusive property or privilege is claimed are defined as follows:

1. Apparatus for creating a Traffic alert and Collision Avoidance System (TCAS) Resolution Advisory (RA) pitch guidance symbol on an electronic attitude display of an airplane in response to a collision avoidance vertical speed command created by a TCAS computer when an intruder enters the airspace protected by the TCAS computer, said apparatus comprising:

(a) pitch guidance control means for:
      (i) receiving data representing the collision avoidance vertical air speed command created by a TCAS computer when an intruder enters the airspace protected by the TCAS computer;
      (ii) receiving data from the airplane representing the vertical air speed of the airplane;
      (iii) receiving a sensitivity factor whose value depends on the true air speed of the airplane; and
      (iv) producing a Resolution Advisory (RA) command; and
   (b) an electronic attitude display means that includes an airplane symbol and a pitch axis scale for receiving said RA command and creating a Resolution Advisory (RA) pitch guidance symbol positioned on said display in association with said pitch axis scale and said airplane symbol.

2. The apparatus claimed in claim 1, wherein said RA pitch guidance symbol delineates a portion of said pitch axis scale to be avoided by said airplane symbol in order to eliminate the threat of a collision with said intruder.

3. The apparatus claimed in claim 2, wherein said RA pitch guidance symbol includes a pitch axis leg and a pair of diverging legs that begin at the ends of said pitch axis leg and end at the periphery of said electronic attitude display.

4. The apparatus claimed in claim 3, wherein said pitch axis leg is straight.

5. The apparatus claimed in claim 3, wherein said pitch axis leg is V-shaped.

6. The apparatus claimed in claim 2, wherein said RA pitch guidance symbol comprises a pair of vertical legs located on either side of said airplane symbol.

7. The apparatus claimed in claim 6, wherein said RA pitch guidance symbol includes visual attraction means located atop said vertical legs.

8. The apparatus claimed in claim 7, where said visual attraction means of said RA pitch guidance symbol also includes visual attraction means located between said vertical legs in alignment with said visual attraction means located atop said vertical legs.

9. The apparatus claimed in claim 2, wherein said pitch guidance symbol comprises a pair of diverging legs that begin on either side of said pitch guidance scale and project towards the periphery of said electronic attitude display.

10. The apparatus claimed in claim 9 including visual attraction means located atop said pair of diverging legs.

11. The apparatus claimed in claim 1, wherein said pitch guidance control means produces said RA command ($RA_{CMD}$) in accordance with the following equation:

$$RA_{CMD} = K(V_{STCAS} - V_{SIND}) - \theta \left( \frac{ts}{ts + 1} \right)$$

where:

$RA_{CMD}$ is the distance between a reference point of the airplane symbol and a predetermined region of the RA pitch guidance symbol;

K is a sensitivity factor whose value is a function of true air speed ($V_{TAS}$) of the airplane;

$V_{STCAS}$ is the vertical speed commanded by the TCAS II computer;

$V_{SIND}$ is the vertical speed of the airplane;

$\theta$ is the pitch attitude of the airplane;

t is the time constant of the LaPlace transform washout function;

s is the standard LaPlace transform operator.

12. The apparatus claimed in claim 11, wherein the sensitivity factor, K, is equal to $$K = \frac{57.3}{101.27 V_{TAS}}$$

between a minimum value of $V_{TAS}$ and $V_{TAStran}$, where $V_{TAS}$ is in knots.

13. The apparatus claimed in claim 11 or 12, wherein said RA pitch guidance symbol delineates a portion of said pitch axis scale to be avoided in order to eliminate the threat of a collision with said intruder.

14. The apparatus claimed in claim 13, wherein said RA pitch guidance symbol includes a pitch axis leg and a pair of diverging legs that begin at the ends of said pitch axis leg and end at the periphery of said electronic attitude display, said $RA_{CMD}$ value defining the distance between said pitch axis leg and said reference point of said airplane symbol.

15. The apparatus claimed in claim 14, wherein said pitch axis leg is straight.

16. The apparatus claimed in claim 14, wherein said pitch axis leg is V-shaped.

17. The apparatus claimed in claim 13, wherein said RA pitch guidance symbol comprises a pair of vertical legs located on either side of said airplane symbol, said $RA_{CMD}$ value defining the distance between the tops of said pair of vertical legs and said reference point of said airplane symbol.

18. The apparatus claimed in claim 17, wherein said RA pitch guidance symbol includes visual attraction means located atop said vertical legs.

19. The apparatus claimed in claim 18, where said visual attraction means of said RA pitch guidance symbol also includes visual attraction means located between said vertical legs in alignment with said visual attraction means located atop said vertical legs.

20. The apparatus claimed in claim 14, wherein said pitch guidance symbol comprises a pair of diverging legs that begin on either side of said pitch guidance scale and project towards the periphery of said electronic attitude display, said $RA_{CMD}$ value defining the distance between the tops of said pair of diverging legs and said reference point of said airplane symbol.

21. The apparatus claimed in claim 9 including visual attraction means located atop said pair of diverging legs.

22. In an electronic attitude display of an airplane that includes an airplane symbol and a pitch axis scale, the improvement comprising a Resolution Advisory (RA) pitch guidance symbol positioned on said display in association with said pitch axis scale and said airplane symbol, wherein said RA pitch guidance symbol delineates a portion of said pitch axis scale to be avoided by said airplane symbol in order to eliminate a threat of a collision with an intruder in the surrounding airspace.

23. The improvement claimed in claim 22, wherein said RA pitch guidance symbol includes a pitch axis leg and a pair of diverging legs that begin at the ends of said pitch axis leg and end at the periphery of said electronic attitude display.

24. The improvement claimed in claim 23, wherein said pitch axis leg is straight.

25. The improvement claimed in claim 23, wherein said pitch axis leg is V-shaped.

26. The apparatus claimed in claim 22, wherein said RA pitch guidance symbol comprises a pair of vertical legs located on either side of said airplane symbol.

27. The apparatus claimed in claim 26, wherein said RA pitch guidance symbol includes visual attraction means located atop said vertical legs.

28. The apparatus claimed in claim 27, where said visual attraction means of said RA pitch guidance symbol also includes visual attraction means located between said vertical legs in alignment with said visual attraction means located atop said vertical legs.

29. The apparatus claimed in claim 22, wherein said pitch guidance symbol comprises a pair of diverging legs that begin on either side of said pitch guidance scale and project towards the periphery of said electronic attitude display.

30. The apparatus claimed in claim 29 including visual attraction means located atop said pair of diverging legs.

* * * * *